US012185090B2

(12) United States Patent
Dharmadhikari (10) Patent No.: US 12,185,090 B2
(45) Date of Patent: Dec. 31, 2024

(54) DYNAMIC TRIGGERING OF MINIMUM PERIODIC SEARCH TIMER

(71) Applicant: CABLE TELEVISION LABORATORIES, INC., Louisville, CO (US)

(72) Inventor: Omkar Shripad Dharmadhikari, Lakewood, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/356,821

(22) Filed: Jun. 24, 2021

(65) Prior Publication Data

US 2021/0410025 A1  Dec. 30, 2021

Related U.S. Application Data

(60) Provisional application No. 63/043,589, filed on Jun. 24, 2020.

(51) Int. Cl.
  *H04W 36/00* (2009.01)
  *H04W 8/22* (2009.01)
  (Continued)

(52) U.S. Cl.
  CPC ....... *H04W 36/00835* (2018.08); *H04W 8/22* (2013.01); *H04W 36/22* (2013.01);
  (Continued)

(58) Field of Classification Search
  CPC . H04W 36/00835; H04W 8/22; H04W 36/22; H04W 36/30; H04W 48/18; H04W 36/0088; H04W 36/14
  (Continued)

(56) References Cited

U.S. PATENT DOCUMENTS

2004/0087305 A1* 5/2004 Jiang .................... H04W 48/18
                                                    455/448
2006/0221901 A1* 10/2006 Yaqub ............. H04W 36/00835
                                                    370/331
(Continued)

FOREIGN PATENT DOCUMENTS

WO   WO-2015154789 A1 * 10/2015 ............ H04W 48/16

*Primary Examiner* — Jae Y Lee
*Assistant Examiner* — Oladiran Gideon Olaleye
(74) *Attorney, Agent, or Firm* — Josh C. Snider; Snider IP (57) ABSTRACT

Systems and methods for performing handovers for a user equipment (UE) include storing a dynamically-triggered search timer value and a high priority public land mobility network (PLMN) identifier at the UE (e.g., using a universal subscriber identity module (USIM). The UE generates a periodic measurement report with a list of PLMN identifiers associated with nearby access network nodes. In response to entering idle mode, the UE 102 determines whether the list of PLMN identifiers includes the high priority PLMN. In response to the list of PLMN identifiers including the high priority PLMN, the UE 102 initiates a dynamically-triggered search for a handover at a time indicated by the dynamically-triggered search timer value rather than by a larger minimum periodic search timer value. Accordingly, the dynamically-triggered search occurs quickly (e.g., between 5 and 30 seconds) after the UE enters the idle mode as compared to minimum periodic search timer-based handover searches.

23 Claims, 5 Drawing Sheets

(51) Int. Cl.
*H04W 36/14* (2009.01)
*H04W 36/22* (2009.01)
*H04W 36/30* (2009.01)
*H04W 48/18* (2009.01)

(52) U.S. Cl.
CPC ............ *H04W 48/18* (2013.01); *H04W 36/14* (2013.01); *H04W 36/302* (2023.05)

(58) Field of Classification Search
USPC ........................................................ 370/331
See application file for complete search history.

(56) References Cited

U.S. PATENT DOCUMENTS

| | | | | |
|---|---|---|---|---|
| 2009/0190550 | A1* | 7/2009 | Giustina | H04L 63/0471 370/331 |
| 2013/0225169 | A1* | 8/2013 | Farnsworth | H04W 60/04 455/436 |
| 2015/0208327 | A1* | 7/2015 | Baratam | H04W 48/16 455/432.1 |
| 2015/0341854 | A1* | 11/2015 | Smith | H04W 48/17 455/450 |
| 2016/0150496 | A1* | 5/2016 | Kim | H04W 48/04 455/435.1 |
| 2019/0044639 | A1* | 2/2019 | Ouchi | H04W 52/18 |
| 2022/0053385 | A1* | 2/2022 | Li | H04W 36/08 |
| 2022/0295260 | A1* | 9/2022 | Yamine | H04W 8/12 |

* cited by examiner

DYNAMIC TRIGGERING OF MINIMUM PERIODIC SEARCH TIMER

CROSS-REFERENCE TO RELATED APPLICATIONS

The present application claims priority under 35 U.S.C. § 119 to U.S. Provisional Application No. 63/043,589, entitled "Dynamic Triggering of Minimum Periodic Search Timer" and filed on Jun. 24, 2020, which is specifically incorporated by reference herein in its entirety.

FIELD

Aspects of the presently disclosed technology relate generally to network handovers and more particularly to performing inter-operator handovers for a User Equipment (UE) using a dynamically-triggered search.

BACKGROUND

Mobile devices are often configured to connect to multiple, different networks. When transitioning between different networks operated by a single network operator, the handover process is generally performed by access nodes of the networks because the access nodes share a common communication interface. However, handovers between networks operated by different network operators (e.g., without a roaming agreement) lack a common interface and are, therefore, performed by the mobile device. Third Generation Partnership Project (3GPP) standards-based settings instruct the mobile device to perform a search for other available networks whenever the mobile device enters an idle mode and a predetermined wait time (e.g., 6 minutes) elapses.

In some situations, a mobile device may be connected to a first network and, while connected to the first network, moves into a coverage area of a second network. The second network may be a preferred network for the mobile device. However, if the first network has a greater transmission power, the mobile device might stay on the first network despite being within coverage of the preferred network. Additionally, once the mobile device moves into the second coverage area of the second network, the mobile device typically does not perform a search for other available networks until the mobile device enters idle mode and the predetermined wait time elapses. As such, the mobile device may experience significant delays in transitioning to the second network once the device moves into the coverage area of the second network. Additional problems arise when attempting to reduce the predetermined wait time because more frequent handover searches increases power consumption, thereby depleting the power source for the mobile device.

SUMMARY

Implementations described and claimed herein address the foregoing problems by performing handovers using a dynamically-triggered handover search. For instance, a method for establishing inter-operator network connections for a user equipment (UE) having a first connection with a first access node associated with a first network can include: obtaining a dynamically-triggered search timer value; obtaining a public land mobility network (PLMN) identifier associated with a second network, the PLMN identifier associated with the second network having a priority level; generating a periodic measurement report including a list of one or more PLMN identifiers detectable by the UE; identifying the PLMN identifier associated with the second network in the list of one or more PLMN identifiers; performing a handover search for networks providing coverage to the UE based on the PLMN identifier associated with the second network being included in the list of one or more PLMN identifiers, the handover search being initiated based on the dynamically-triggered search timer value; and establishing a second connection between the UE and a second access node associated with the second network based on the handover search.

In some examples, the method further comprises: storing, at the UE, a minimum periodic search timer value that is greater than the dynamically-triggered search timer value. The method can further comprise storing, at the UE, a PLMN search value that is greater than the dynamically-triggered search timer value. The first network can be a public network provided by a mobile network operator (MNO) network and the second network is a multiple service operator (MSO) network. The MSO network can be a private Local Area Network operating on citizens' broadband radio service (CBRS) spectrum. The periodic measurement report can be generated in connection with a reporting process to the first access node. The periodic measurement report can further include a cell identifier associated with the second access node and one or more Evolved Universal Mobile Telecommunications System Terrestrial Radio Access Absolute Radio Frequency Channel Numbers (EARFCN) values corresponding to the one or more PLMN identifiers, the handover search can be performed based on at least one of the cell identifier or the one or more EARFCN values. In some instances, the method further comprises: determining a Reference Signal Received Power (RSRP) value, a Reference Signal Received Quality (RSRQ) value, or Received Signal Strength Indicator (RSSI) corresponding to the second access node, the handover search performed based on the RSRP value, the RSRQ value, or the RSSI value being greater than a signal strength threshold value.

In some examples, the dynamically-triggered search timer value, the PLMN identifier, and a minimum periodic search timer value are stored at a universal subscriber identity module (USIM). The periodic measurement report can be a first periodic measurement report, the list of one or more PLMN identifiers can be a first list of one or more PLMN identifiers, and the handover search can be a first handover search, and the method can further comprise: obtaining a minimum periodic search timer value at the UE; generating, a second periodic measurement report including a second list of one or more PLMN identifiers, the PLMN identifier associated with the second network being absent from the second list of one or more PLMN identifiers; and performing a second handover search based on the minimum periodic search timer value based on the PLMN identifier being absent from the second periodic measurement report. Moreover, the minimum periodic search timer value can be between 1 minute and 8 minutes and the dynamically-triggered search timer value can be between five seconds and 30 seconds.

In some examples, a user equipment (UE) for establishing inter-operator network connections includes: a processor; and one or more memory devices storing instructions that, when executed by the processor, cause the UE to: establish a first connection with a first access node associated with a first network; obtain a dynamically-triggered search timer value; obtain a public land mobility network (PLMN) identifier associated with a second network; generate a periodic measurement report including a list of one or more public land mobility network (PLMN)s detectable by the UE; initiate, at a time indicated by the dynamically-triggered search timer value, a handover search based on the periodic measurement report including the PLMN identifier; and establish a second connection with a second access node of the second network based on the handover search.

In some examples, the first network is a public network provided by a mobile network operator (MNO) and the second network is a private local area network (LAN) operating on citizens' broadband radio service (CBRS) spectrum. The one or more memory devices can include a universal subscriber identity module (USIM) and the dynamically-triggered search timer value is stored at the USIM. The handover search can be a higher priority PLMN search triggered by the periodic measurement report to find the second network. In some instances, the instructions, when executed by the processor, further cause the UE to: enter an idle mode; and determine whether the periodic measurement report lists the PLMN identifier based on the UE entering the idle mode.

In some examples, a user equipment (UE) for establishing inter-operator network connections includes: a processor; and one or more memory devices storing instructions that, when executed by the processor, cause the UE to: generate a first periodic measurement report; perform a first handover search based on: a minimum periodic search timer value; and a public land mobility network (PLMN) identifier being absent from the first periodic measurement report; establish a first connection with a first access node associated with a first network based on the first handover search; generate a second periodic measurement report including a second list of one or more PLMN identifiers detectable by the UE; determine that the second list of one or more PLMN identifiers includes the PLMN identifier; perform a second handover search based on a dynamically-triggered search timer value at least partly in response to the second periodic measurement report including the PLMN identifier; and establish a second connection with a second access node associated with a second network based on the second handover search.

In some examples, the first access node is a macro cell and the second access node is a small or femto cell operating on citizens' broadband radio service (CBRS) spectrum to connect the UE to the second network. The one or more memory devices can include a universal subscriber identity module (USIM); the minimum periodic search timer value and the dynamically-triggered search timer value being stored at the USIM; and the minimum periodic search timer value and the dynamically-triggered search timer value can be different values. In some instances, the instructions, when executed by the processor, further cause the UE to store, at the USIM: a home PLMN (HPLMN) identifier or an extended home PLMN (EHPLMN) identifier associated with the second network; and a visitor PLMN (VPLMN) identifier associated with the first network.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

The present disclosure involves systems and methods of performing handovers for a user equipment (UE) based on a dynamically-triggered search timer value. In one aspect, multiple networks operated are by different network operators, such as a first network (e.g., a public network) and a second network (e.g., a private network), providing coverage to the UE. The system performs an inter-operator handover quickly and efficiently when a preferred network is detected. The UE stores a high priority public land mobility network (PLMN) identifier indicating that the second network is a high priority network (e.g., a preferred network) for the UE. Upon determining that the second network is within range, the UE initiates a handover procedure by performing a dynamically-triggered search—which results in a significantly shorter wait period than minimum periodic search timer-based searches—connecting the UE to the high priority network.

For instance, the UE can enter an idle mode while within the coverage area of the second network. In response to entering the idle mode, the UE determines whether the most recently generated periodic measurement report includes the high priority PLMN identifier. If the high priority PLMN identifier is present in the periodic measurement report, the UE selects the dynamically-triggered search timer value instead of the minimum periodic search timer value (or any other search timer values) to decide a length of a delay interval (e.g., the time from entering idle mode to initiating the handover search). The dynamically-triggered search timer value indicates an amount of time (e.g., between five and 30 seconds) that is less than an amount of time indicated by the minimum periodic search timer value (e.g., six minutes), which significantly shortens the delay. As such, the UE can switch to the preferred network faster than other networks once the preferred network is within a transmit range of the UE. Moreover, because the minimum periodic search timer value is still used whenever the high priority PLMN identifier is absent from the periodic measurement report, rapid handover searches that would result in battery depletion of the UE are avoided when the UE is outside the coverage area of the preferred network.

In addition to such example benefits to the UE and user experience, operators of the networks also benefit from the presently disclosed technology. Some preferred networks bill the subscriber of the UE based on an amount of time the UE is connected to the preferred network. When the preferred network operator is a private operator (e.g., operating on citizens' broadband radio service (CBRS)), significant profits can be lost by prolonged handover delays that reduce an amount of network connection time for the UE. Moreover, public networks have high power macro cells with higher transmit power than the small cells in some private operator's network (even when the UE is closer in proximity to the small cell), which can delay transitions to the private network when the handover is based solely on signal strength. The UE performs the handover procedure instead of access nodes to connect to the private network. By selecting the dynamically-triggered search timer value instead of the minimum periodic search timer value, the UE significantly speeds up this process.

As such, storing the dynamically-triggered search timer value and the high priority PLMN at the UE (e.g., using a universal subscriber identity module (USIM)) results in a reduced search timer delay interval for conducting the handover search when the UE is within the preferred network coverage area. This increases the profitability of the preferred network by increasing an amount of billable network connectivity time. Additional advantages will become apparent from the disclosure herein.

Figure 1:
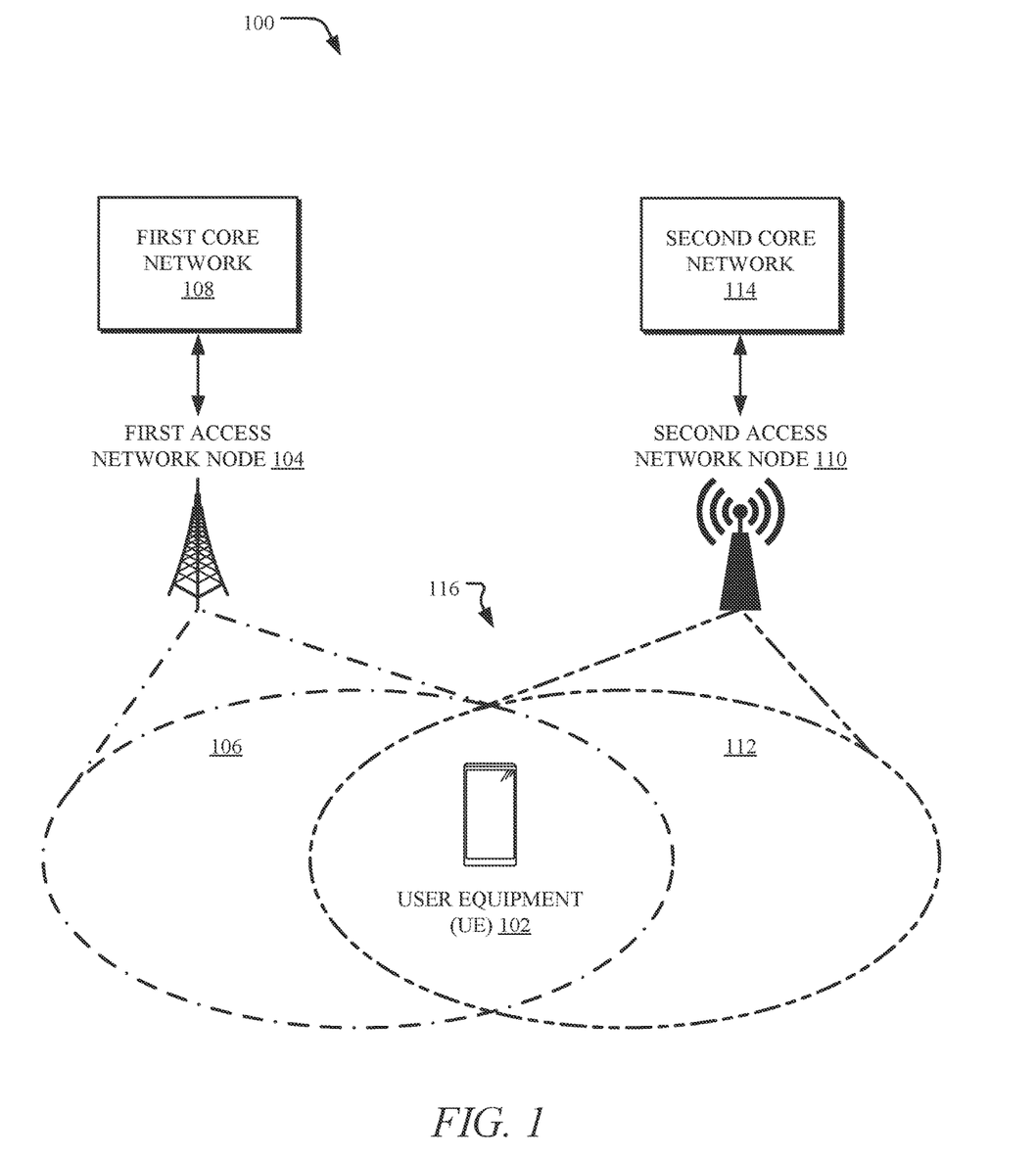
FIG. 1 illustrates an example system for performing an inter-operator handover for a user equipment (UE) using a dynamically-triggered search.

FIG. 1 illustrates an example system 100 for performing handovers for a UE 102. The system 100 can include a first access network node 104 providing a first coverage area 106. When the UE 102 is within the first coverage area 106, the first access network node 104 connects the UE 102 to a first core network 108. A second access network node 110 can provide a second coverage area 112 for connecting the UE 102 to a second core network 114 when the UE 102 is within the second coverage area 112. The first core network 108 and/or the second core network 114 can be any combination networks such as a 3rd Generation Partnership Project (3GPP) network, (e.g., a third generation (3G) network, a fourth generation (4G) network, a fifth generation (5G) network, a Long-Term Evolution (LTE), and/or an LTE Advanced Network), a Global System for Mobile Communications (GSM) network, a Universal Mobile Telecommunications System (UMTS) network, and the like. Additionally, in some instances, the first core network 108 and/or the second core network 114 can be other types of networks such as public or private Wide Area Networks (WAN)s, Local Area Networks (LAN)s (e.g., Bluetooth®, Wi-Fi, etc.) and the like.

The first access network node 104 and/or the second access network node 110 can be a variety of different types of access nodes to connect to different types of networks (e.g., as discussed above). For instance, the first core network 108 can be a public network operated by Multiple Network Operator (MNO), and the first access network node 104 can be a maco cell providing the first coverage area 106 as a large or long-range coverage area for the MNO. The first access network node 104 can provide a large coverage area (e.g., the first coverage area 106) and can include a radio tower and/or high-powered antenna with a high transmit power with a multiple kilometer range, such as between 1 and 20 kilometer range.

In some examples the second access network node 110 can be a small cell, femto cell, or other low-powered or short-range radio access nodes for connecting the UE 102 to the second core network 114. For instance, the second access network node 110 can have a range of a few meters (e.g., between 10 meters and 1000 meters) or a few kilometers (e.g., between 1 kilometer and 5 kilometers). Alternatively, the second access network node 110 is a macro cell with a larger transmit range. The second core network 114 can be a private network (e.g., a LAN) operated by a Multiple Service Operator (MSO), for instance, on citizens' broadband radio service (CBRS) spectrum. The second core network 114, for instance, can use technologies to create a dedicated network with unified connectivity and a secure means of communication within a small geographic area. By using CBRS spectrum (e.g., rather than, for instance, Wi-Fi) the second core network 114 can provide connectivity for a wide range of services, such as enterprise services, healthcare, and industrial Internet of Things (IoT).

In some instances, the first access network node 104, the second access network node 110 (or any access network nodes of the system 100) include a 3GPP node such as a Node B, an eNodeB, or a Home eNodeB, or an access node for other types of networks (e.g., a Global System for Mobile Communications (GSM) base transceiver station (BTS)). One or both of the first core network 108 and the second core network 114 can include a Mobility Management Entity (MME) of an Evolved Packet Core (EPC)) for receiving messages from the first access network node 104 or the second access network node 110 (e.g., to establish connections between the UE 102 and the first core network 108 or the second core network 114).

In some examples, the first core network 108 and the second core network 114 are operated by different operators using different PLMN values to provide overlapping wireless network coverage to a geographic region 116 (e.g., a room, a building, a street, a portion of a city or county, a park, etc.). For instance, the MNO may operate the first core network 108 and the MSO may operate the second core network 114. The UE 102 can establish a first network connection with the first core network 108 using the first access network node 104 and, while connected to the first core network 108, move through the geographic region 116. For instance, the UE 102 may be carried by a user moving across a geographic area causing the UE 102 to travel from a first coverage area 106 of the first access network node 104 into an overlapping area with the second coverage area 112 of the second access network node 110 (or a portion of the second coverage are 112 not overlapping with the first coverage area 106). In some instances, the second core network 114 may be preferred network for the UE 102 or the user of the UE 102. As such, upon entering the second coverage area 112 of the second access network node 110, the UE 102 may perform one or more operations to detect the presence of the preferred network and initiate a handover procedure with the second access network node 110. The UE 102 may use a dynamically-triggered search in response to detecting the presence of the preferred network to reduce a delay period for the handover to the preferred network. Accordingly, the system 100 improves the handover process by quickly transferring the UE 102 to the preferred network (e.g., the second core network 114) when the preferred network is detected while avoiding draining a battery of the UE 102. This process and examples of the corresponding advantages are discussed in greater detail below.

Figure 2:
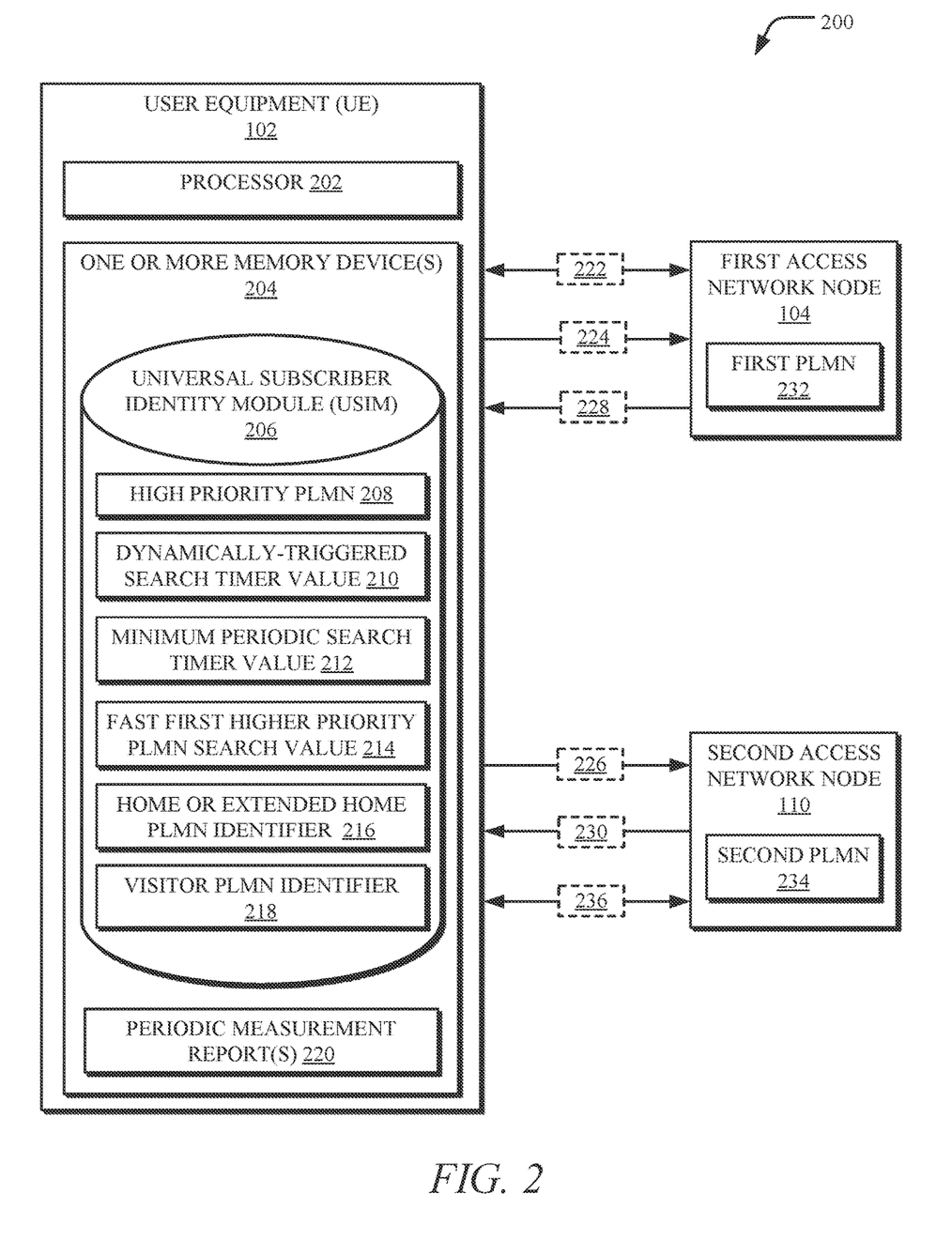
FIG. 2 illustrates an example system for establishing one or more connections with one or more access network nodes using a dynamically-triggered search.

FIG. 2. illustrates an example system 200 for performing handovers for the UE 102, which may form at least a portion of system 100. The UE 102 includes a processor 202 and one or more memory device(s) 204 storing various types of data and information related to the UE 102. Such data may be accessed by the UE 102 to perform the handover process. The UE 102 can send and receive multiple messages to the first access network node 104 and/or the second access network node 110 to determine whether the UE 102 is within the coverage area of the preferred network (e.g., the second coverage area 112) and, in response, perform the dynamically-triggered handover search. Hardware components of the UE 102 are discussed in greater detail below regarding FIG. 3.

In some examples, the memory device(s) 204 can include a universal subscriber identity module (USIM) 206 and other local memory. For instance, the USIM 206 forms a part of a universal integrated circuit card (UICC) (e.g., as an interfacing application for the UICC). Some of the advantages discussed herein result from storing certain values with the USIM 206 to be retrievable by the UE 102 when triggering the handover procedure. For instance, the values can be stored at the USIM 206 by a UE manufacturer to create the preferred network for the UE manufacturer, and/or the values can be stored at the USIM 206 by a network operator or service operator to create the preferred network for the network operator or service operator.

In some examples, a high priority PLMN identifier 208 and a dynamically-triggered search timer value 210 are stored with the USIM 206. The high priority PLMN identifier 208 is a PLMN identifier corresponding to (e.g., designating) the preferred network (e.g., the second core network 114). A PLMN identifier includes a mobile country code (MCC) and a mobile network code (MNC) identifying a particular network. As noted above, the high priority PLMN identifier 208 can be stored at the UE 102 by a manufacturer of the UE 102 and/or sent to the UE 102 by a network operator (e.g., during a setup procedure and/or as an operating system update). The dynamically-triggered search timer value 210 can be a value (e.g., a number) indicating a first amount of time (e.g., between five and 30 seconds) that will elapse before performing the handover search (e.g., a dynamically-triggered search). The UE 102 can store other search timer values with the USIM 206 in addition to the dynamically-triggered search timer value 210, such as a minimum periodic search timer value 212 and/or a fast first higher priority PLMN search value 214. The minimum periodic search timer value 212 is a 3GPP-specified value that sets a minimum value indicating a second amount of time that is greater than the first amount of time (e.g., between 1 minute and 8 minutes), and the fast first higher priority PLMN search value 214 indicates a third amount of time that will elapse before performing the handover search, for instance, when a fast first higher priority PLMN search is enabled and when the UE 102 selects a visitor PLMN (e.g., as defined by 3GPP standards). As such, the UE 102 can store at least three different search timer values and may select which of the at least three search timer values to use based on whether the preferred network associated with the high priority PLMN 208 is detected. Moreover, the USIM 206 can store other PLMN values indicating which network is the preferred network and/or whether a network is not the preferred network, such as a home or extended home PLMN identifier 216 (e.g., corresponding to the second core network 114) or a visitor PLMN identifier 218 (e.g., corresponding to the first core network 108). As such, the USIM 206 can store at least three different PLMN identifiers.

Additionally, in some instances, the UE 102 generates and/or stores one or more periodic measurement report(s) 220 (e.g., stored in other local memory of the memory device(s) 204). The UE 102 generates the periodic measurement report(s) 220 periodically by scanning frequencies accessible to the UE 102 to detect any access network nodes that might be available as a target access network node for the handover. For instance, the periodic measurement report(s) 220 can include data such as a list of PLMN identifiers associated with detectable networks and/or signal strengths associated with detectable networks (e.g., Reference Signal Received Power (RSRP) values, Reference Signal Received Quality (RSRQ) values, or Received Signal Strength Indicator (RSSI) values). Moreover, the periodic measurement report(s) 220 can include cell identifier(s) associated with detectable access network nodes and/or one or more Evolved Universal Mobile Telecommunications System Terrestrial Radio Access Absolute Radio Frequency Channel Numbers (EARFCN) values associated with detectable networks. The periodic measurement report(s) 220 may be generated while the UE 102 is in an idle mode or a connected mode and be based on information transmitted between the UE 102 and the access network nodes via, for instance, one or more System Information Block (SIB) and/or Radio Resource Control (RRC) messages (e.g., as part of a handover process). The periodic measurement report(s) 220 indicate which access network nodes are available as target access network nodes (e.g., have a coverage area currently providing coverage to the UE 102). In some instances, the periodic measurement report 220 is generated as part of a reporting process to the source access network node (e.g., the first access network node 104). For instance, the UE 102 may be configured to send the periodic measurement report 220 to the first access network node 104 to inform the first access network node 104 of the potential target access network nodes for the handover procedure.

The UE 102 can establish a first connection 222 with the first access network node 104 of the first core network 108. The UE 102 can generate the periodic measurement report (s) 220 by sending a first request for information 224 to the first access network node 104 (e.g., a first ping), a second request for information 226 to the second access network node 110 (e.g., a second ping), and any number of requests for information to other access network nodes within range of the UE 102 as the UE 102 cans different frequencies. In response, the UE 102 receives a first response message 228 from the first access network node 104 and a second response message 230 from the second access network node 110. The first response message 228 includes a first PLMN identifier 232 corresponding to the first core network 108 and the second response message 230 includes a second PLMN identifier 234 corresponding to the second core network 114. The UE 102 generates and/or stores the periodic measurement report 220 with the list of PLMN identifiers including the first PLMN identifier 232 and the second PLMN identifier 234 at the memory device(s) 204.

In some examples, the UE 102 may use the information in the periodic measurement report(s) 220 to determine whether to base a handover search on the dynamically-triggered search timer value 210 or the minimum periodic search timer value 212 (or another search timer value). For instance, the UE 102 enters an idle mode and, in response to entering the idle mode, determines whether the list of PLMN identifiers in the periodic measurement report 220 includes the high priority PLMN identifier 208 (e.g., by executing a search on the list of PLMN identifiers and/or by otherwise comparing the list of PLMN identifiers to the high PLMN identifier 208). The UE 102 can determine that the periodic measurement report 220 includes a PLMN identifier that is a same PLMN identifier as the high priority PLMN identifier 208. For instance, the UE 102 can determine that the second PLMN identifier 234 in the periodic measurement report 220 is the same PLMN identifier as the high priority PLMN 208. In response to this determination, the UE 102 initiates the dynamically-triggered search using the dynamically-triggered search timer value 210. Additionally or alternatively, the UE 102 can determine that the second PLMN identifier 234 is the same PLMN identifier as the home or extended home PLMN identifier 216 and, in response, initiate the dynamically-triggered search using the dynamically-triggered search timer value 210. Additionally or alternatively, the UE 102 can determine that cell identifier and/or an EARFCN value corresponds to the preferred network and, in response, initiate the dynamically-triggered search based on the dynamically-triggered search timer value 210. The UE 102 can initiate the dynamically-triggered search based on the dynamically-triggered search timer value 210 (e.g., after between 5 and 30 seconds has elapsed), and detect the second access network node 110 during the dynamically-triggered search. The dynamically-triggered search can be a higher priority PLMN search (e.g., triggered by the periodic measurement report 220) for finding and connecting to the second core network 114 associated the high priority PLMN identifier 208. For instance, the UE 102 can determine during the dynamically-triggered search that the second access network node 110 corresponds to the high priority PLMN identifier 208 and, in response, establish a second connection 236 with the second access network node 110, thus completing the handover procedure. Additionally or alternatively, the UE 102 can perform the handover search based at least partly on a signal strength value (e.g., an RSRP value, an RSRQ value, or an RSSI value) in the measurement report being greater than a predetermined threshold value.

In some examples, the UE 102 can determine that the measurement report(s) 220 lack the high priority PLMN identifier 208 (e.g., and/or the home or extended home PLMN identifier 216). In response to this determination, the UE 102 can initiate a search based on a search timer value other than the dynamically-triggered search timer value 210, such as based on the minimum periodic search timer value 212. Searches occurring when the high priority PLMN identifier 208 is lacking from the periodic measurement report 220 may have a greater amount of waiting time or a longer delay interval before initiating the search (e.g., 1 to 8 minutes).

In some examples, the UE 102 performs multiple searches based on multiple periodic measurement reports 220. The UE 102 can generate a first periodic measurement report 220 and determine whether the first periodic measurement report 220 lists the high priority PLMN identifier 208. For instance, the UE 102 can determine that the first periodic measurement report 220 lacks or omits the high priority PLMN identifier 208 and, in response, initiate a first handover search based on the minimum periodic search timer value 212. The first handover search can result in establishing the first connection 222 between the UE 102 and the first access network node 104. While connected to the first core network 108 via the first connection 222, the UE 102 can generate a second periodic measurement report 220 and determine whether the second periodic measurement report 220 lists the high priority PLMN identifier 208. For instance, the UE 102 may have moved into the second coverage area 112 since the first periodic measurement report 220 was generated and, as such, determines that the second periodic measurement report 220 includes the high priority PLMN identifier 208. In response to this determination, the UE 102 can initiate a second handover search based on the dynamically-triggered search timer value 210. The second handover search can result in establishing the second connection 236 between the UE 102 and the second access network node 110 (e.g., or whichever access network node is associated with the high priority PLMN identifier 208). The second connection 236 can be established more quickly than the first connection 222 because the second handover search is based on the shorter wait time period indicated by the dynamically-triggered search timer value 210 than the longer wait time period indicated by the minimum periodic search timer value 212.

Alternatively, the first periodic measurement report 220 can include the high priority PLMN identifier 210 and the second periodic measurement report 220 can lack the high priority PLMN identifier 210. In this case, the first handover search is based on the dynamically-triggered search timer value 210 and the second handover search is based on the minimum periodic search timer value 212. As such, the first handover search occurs with a shorter wait time period than the second handover search to establish the first connection 222 with the preferred network (e.g., the second core network 114). The second handover search establishes the second connection 236 with a non-preferred network, in this case, the first core network 108. Any combination of these scenarios can occur for any number of networks as the UE moves through multiple geographic regions.

By adjusting the search wait time period based on changing network coverage conditions (as reflected in the periodic measurement report(s) 220), the system 200 can improve the operation of the UE 102, the first core network 108 and the second core network 114. Using the longer minimum periodic search timer value 212 when the UE 102 is outside the coverage area of the preferred network (e.g., the second coverage area 112) prevents the UE 102 from performing multiple, rapid handover searches that drains the battery. Moreover, using the shorter dynamically-triggered search timer value 210 when the UE 102 is within the coverage area of the preferred network reduces a delay time for switching from the non-preferred network (e.g., the first core network 108) to the preferred network (e.g., the second core network 114). Therefore, the UE 102 can switch to the preferred network more quickly once the preferred network is within a transmit range of the UE 102 without wasting time in idle mode. Furthermore, operators that bill a user of the UE 102 based on an amount of time the UE 102 is connected to the preferred network can increase their profitability by increasing an amount of connectivity time the operator can bill. Moreover, transferring off of the non-preferred network more quickly when the preferred network is available reduces network traffic and corresponding computational resources used by the non-preferred network to service the UE 102.

Figure 3:
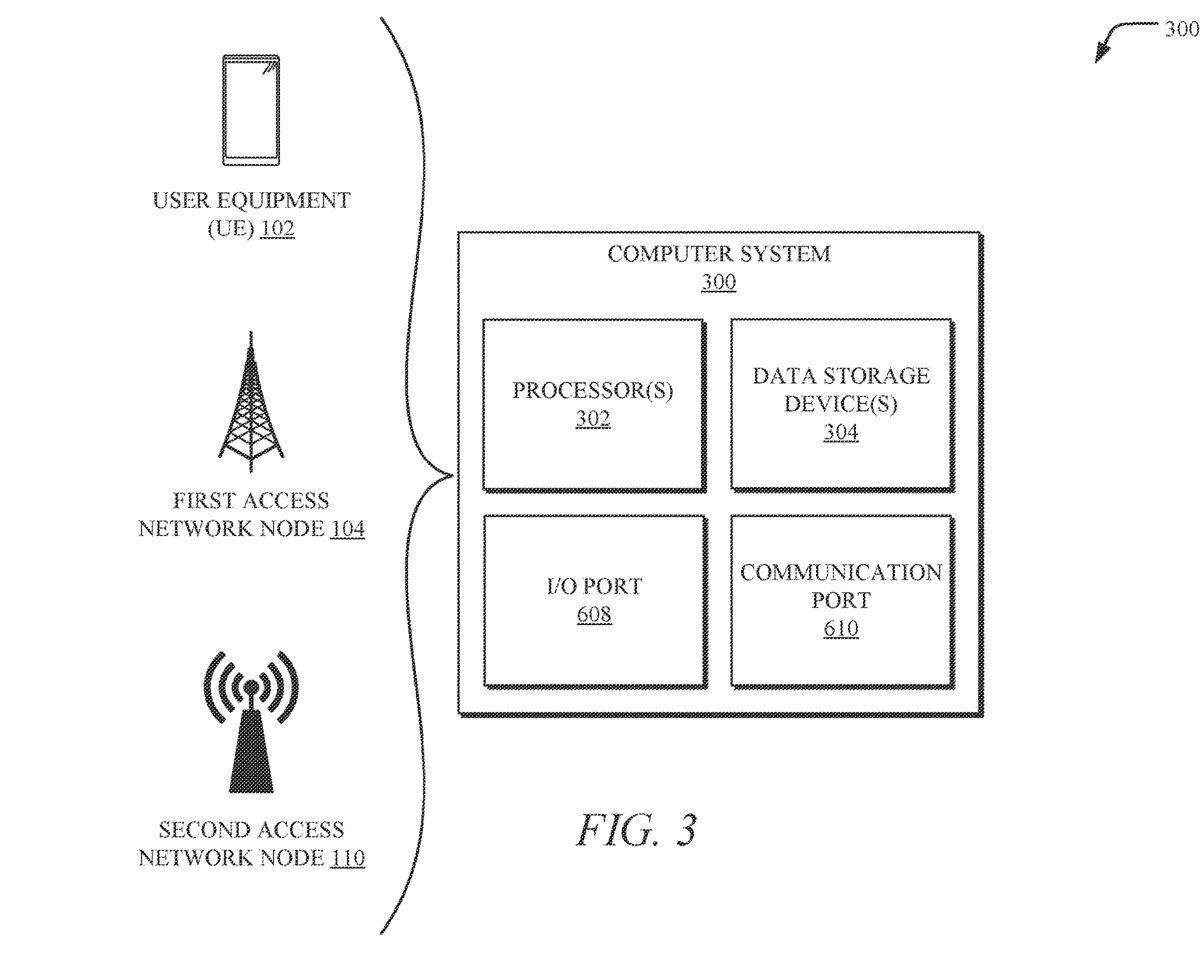
FIG. 3 illustrates an example computing system which may form at least a portion of any of the systems discussed herein.

FIG. 3 illustrates an example of one or more computer system(s) 300 which may form at least a portion of any of the systems discussed herein. FIG. 3 discloses an example computer system 300 having one or more computing units which may implement the systems 100 and 200 and methods 400 and 500 discussed herein. It will be appreciated that specific implementations of these devices may have differing possible specific computing architectures not all of which are specifically discussed herein but will be understood by those of ordinary skill in the art.

In some instances, the computer system(s) 300 may be or form at least a portion of the UE 102, which could be a computer, a desktop computer, a laptop computer, a cellular or mobile device, a smart mobile device, a wearable device (e.g., a smart watch, smart glasses, a smart epidermal device, etc.) an Internet-of-Things (IoT) device, a smart home device, a medical device, a virtual reality (VR) or augmented reality (AR) device, a vehicle (e.g., a smart bicycle, an automobile computer, etc.), combinations thereof, and the like. In additional or alternative examples, the computer system 300 illustrated in FIG. 3 can form at least a portion and/or perform the functions of the first access network node 104, the second access network node 110, or other network functions (NF)s forming a part of or communicating with the access network.

The computer system 300 may be capable of executing a computer program product to execute a computer process. Data and program files may be input to the computer system 300, which reads the files and executes the programs therein. Some of the elements of the computer system 300 are shown in FIG. 3 (and FIG. 2 illustrating the UE 102 example of the computer system 300), including one or more hardware processors 302 (e.g., which may be similar or identical to the processor 202), one or more data storage devices 304 (e.g., which may be similar or identical to the one or more memory device(s) 204), one or more I/O ports 306, and/or one or more communication ports 308. Additionally, other elements that will be recognized by those skilled in the art may be included in the computer system 300. Various elements of the computer system 300 may communicate with one another by way of one or more communication buses, point-to-point communication paths, or other communication means.

The processor 302 (e.g., the processor 202) includes, for example, a central processing unit (CPU), a microprocessor, a microcontroller, a digital signal processor (DSP), and/or one or more internal levels of cache. There can be one or more processors 302, such that the processor 302 comprises a single central-processing unit, or a plurality of processing units capable of executing instructions and performing operations in parallel with each other, referred to as a parallel processing environment.

The computer system 300 may be a stand-alone computer, a distributed computer, or any other type of computer, such as one or more external computers made available via a cloud computing architecture. The presently described technology is optionally implemented in software stored on the data storage device(s) 304 (e.g., the one or more memory device(s) 204), and/or communicated via one or more of the I/O port(s) 306 and/or communication port(s) 308, thereby transforming the computer system 300 in FIG. 3 to a special purpose machine for implementing the operations described herein. Examples of the computer system 300 include personal computers, terminals, microcontrollers, base stations, workstations, mobile phones, tablets, laptops, personal computers, multimedia consoles, gaming consoles, set top boxes, and the like.

The one or more data storage device(s) 304 may include any non-volatile data storage device capable of storing data generated or employed within the computer system 300, such as computer-executable instructions for performing a computer process, which may include instructions of both application programs and an operating system (OS) that manages the various components of the computer system 300. The data storage device(s) 304 may include, without limitation, magnetic disk drives, optical disk drives, solid state drives (SSDs), flash drives, and the like. The data storage devices 304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The data storage device(s) 304 may include volatile memory (e.g., dynamic random access memory (DRAM), static random access memory (SRAM), etc.) and/or non-volatile memory (e.g., read-only memory (ROM), flash memory, etc.). The data storage device may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Computer program products containing mechanisms to effectuate the systems and methods in accordance with the presently described technology may reside in the data storage device(s) 304, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures. The machine-readable media may store instructions that, when executed by the processor, cause the systems to perform the operations disclosed herein.

In some implementations, the computer system 300 includes one or more ports, such as the one or more input/output (I/O) port(s) 306 and the one or more communication port(s) 308, for communicating with other computing, network, or reservoir development devices. It will be appreciated that the I/O port(s) 306 and the communication port(s) 308 may be combined or separate and that more or fewer ports may be included in the computer system 300.

The I/O port(s) 306 may be connected to an I/O device, or other device, by which information is input to or output from the computer system 300. Such I/O devices may include, without limitation, one or more input devices, output devices, and/or environment transducer devices.

In some implementations, the input devices convert a human-generated signal, such as, human voice, physical movement, physical touch or pressure, and/or the like, into electrical signals as input data into the computer system 300 via the I/O port 306. Similarly, the output devices may convert electrical signals received from computer system 300 via the I/O port 306 (or generated by the computer system 300) into signals that may be sensed as output by a human, such as sound, light, and/or touch. The input device may be an alphanumeric input device, including alphanumeric and other keys for communicating information and/or command selections to the processor 302 via the I/O port 306. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a projector, a speaker, a tactile and/or haptic output device, and/or the like. In some implementations, the input device and the output device may be the same device, for example, in the case of a touchscreen.

In some implementations, a communication port 308 is connected to a network by way of which the computer system 300 may receive network data useful in executing the methods and systems set out herein as well as transmitting information and network configuration changes determined thereby. For instance, the communication port 308 may use any of the 3GPP access layer protocols and messages discussed. Examples of such networks or connections include, without limitation, a 3GPP access layer connection (e.g., an S1 MME interface or an S2 interface), Universal Serial Bus (USB), Ethernet, Wi-Fi, Bluetooth®, Near Field Communication (NFC) and so on. One or more such communication interface devices may be utilized via the communication port 308 to communicate to one or more other machines, either directly over a point-to-point communication path, over a WAN (e.g., the Internet), over a LAN, or a cellular network (e.g., a GSM, 3G, 4G, LTE, or 5G network), or over another communication means. Further, the communication port 308 may communicate with an antenna or other link for electromagnetic signal transmission and/or reception.

In an example implementation, operations performed by the systems 100 and 200 discussed herein may be embodied by instructions stored on the data storage devices 304 and executed by the processor 302. One or more of the computer system 300 may be integrated with or otherwise form part of the UE 102, the first access network node 104, and/or the second access network node 110. Furthermore, methods disclosed herein may be implemented as sets of instructions or software readable by the processor 302. Further, it is understood that the specific order or hierarchy of steps in the methods disclosed are instances of example approaches. The accompanying method claims present elements of the various steps in a sample order, and are not necessarily meant to be limited to the specific order or hierarchy presented, for instance, when implemented as the sets of instructions or software executed by the computer system 300.

The computer system 300 set forth in FIG. 3 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 4:
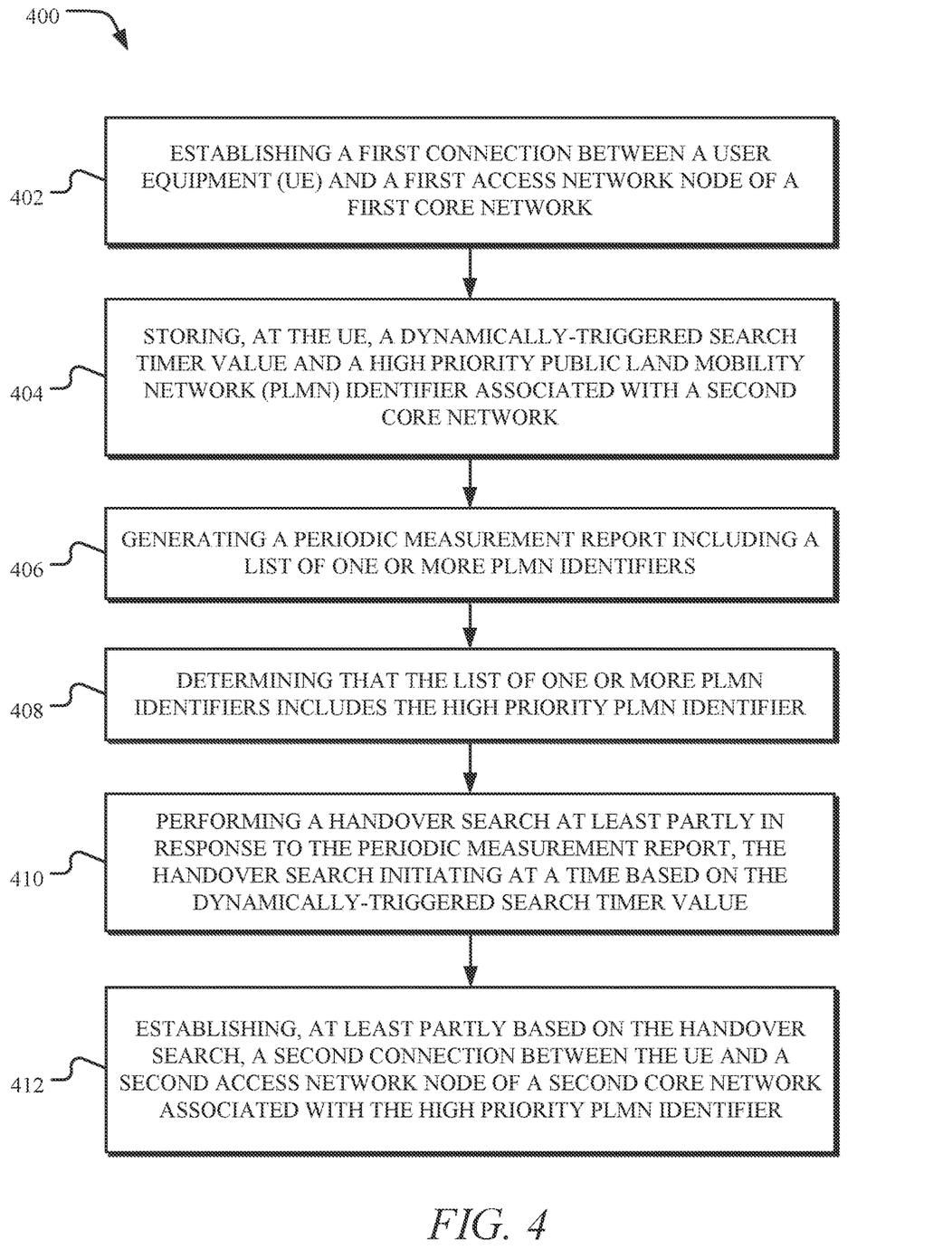
FIG. 4 illustrates example operations of a method for performing an inter-operator handover for a UE using a dynamically-triggered search.

FIG. 4 illustrates an example method 400 of performing handovers for a UE using a dynamically-triggered search timer value. For instance, an operation 402 establishes a first connection between the UE and a first access network node of a first core network. An operation 404 stores the dynamically-triggered search timer value and a high priority PLMN identifier associated with a second core network. An operation 406 generates a periodic measurement report including the list of one or more PLMN identifiers. An operation 408 determines (e.g., in response to the UE entering an idle mode) that the list of one or more PLMN identifiers includes a high priority PLMN identifier. An operation 410 performs a handover search at least partly in response to the periodic measurement report. The handover search initiates at a time based on the dynamically-triggered search timer value. An operation 412 establishes, at least partly based on the handover search, the second connection between the UE and the second access network node of the second core network associated with the high priority PLMN identifier.

Figure 5:
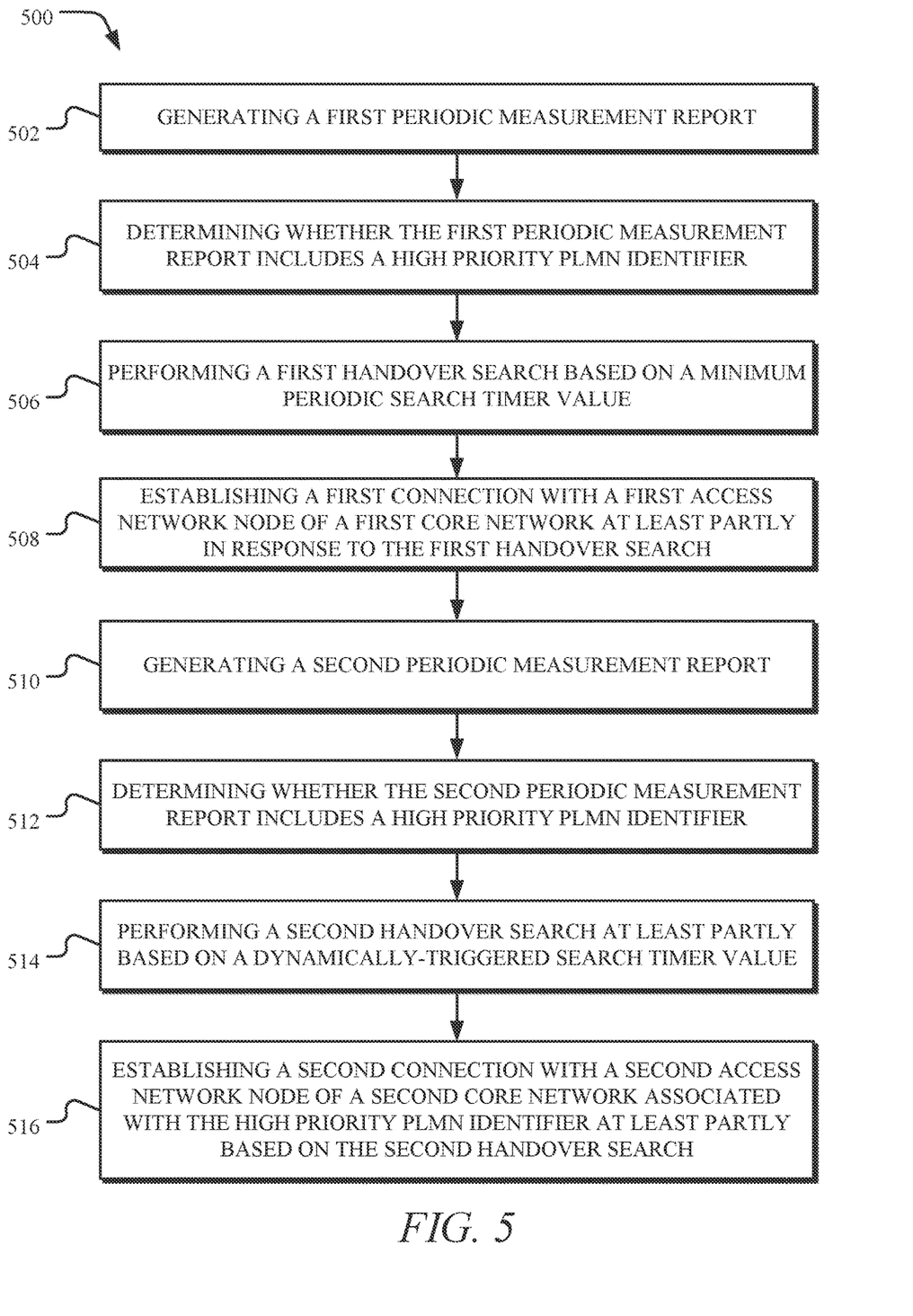
FIG. 5 illustrates example operations of a method for establishing one or more connections with one or more access network nodes using a dynamically-triggered search.

FIG. 5 illustrates an example method 500 of performing handovers for a UE using a dynamically-triggered search timer value. For instance, an operation 502 generates a first periodic measurement report. An operation 504 determines whether the first periodic measurement report includes a high priority PLMN identifier. An operation 506 performs a first handover search based on a minimum periodic search timer value. An operation 508 establishes a first connection with a first access network node of a first core network at least partly in response to the first handover search. An operation 510 generates a second periodic measurement report. An operation 512 determines whether the second periodic measurement report includes the high priority PLMN identifier. An operation 514 performs a second handover search at least partly based on the dynamically-triggered search timer value. An operation 516 establishes a second connection with a second access network node of a second core network associated with the high priority PLMN identifier at least partly based on the second handover search.

It is to be understood that the specific order or hierarchy of steps in the methods depicted in FIGS. 4 and 5 are instances of example approaches and can be rearranged while remaining within the disclosed subject matter. For instance, any of the steps depicted in FIGS. 4 and 5 may be omitted, repeated, performed in parallel, performed in a different order, and/or combined with any other of the steps depicted in FIGS. 4 and 5.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method for establishing inter-operator network connections for a user equipment (UE) having a first connection with a first access node associated with a first network different from a home network of the UE, wherein the UE is configured with a predetermined wait time to execute searches for available networks, the method including steps of:

determining, from a first periodic measurement report, that the first network is not the home network of the UE;

obtaining, after the step of determining, (i) a dynamically-triggered search timer value based on the step of determining, and (ii) a first public land mobility network (PLMN) identifier associated with a second network, the first PLMN identifier associated with the second network having a first priority level;

generating a second periodic measurement report including a list of one or more PLMN identifiers detectable by the UE;

identifying the first PLMN identifier associated with the second network in the list of one or more PLMN identifiers;

initiating, after the step of identifying and at a triggered handover search time based on the obtained dynamically-triggered search timer value, a handover search for the second network, wherein the triggered handover search time has a duration less than a duration of the predetermined wait time; and establishing a second connection between the UE and a second access node associated with the second network based on the handover search, wherein the determination that the first network is not the home network of the UE is based on the first periodic measurement report lacking the first PLMN identifier, wherein the second network is the home network of the UE, and wherein the first network is not the home network of the UE.

2. The method of claim 1, further comprising a step of:
storing, at the UE, a minimum periodic search timer value that is greater than the dynamically-triggered search timer value.

3. The method of claim 1, further comprising a step of:
storing, at the UE, a PLMN search value that is greater than the dynamically-triggered search timer value.

4. The method of claim 1, wherein the first network is a public network provided by a mobile network operator (MNO) network and the second network is a multiple service operator (MSO) network.

5. The method of claim 4, wherein the MSO network is a private Local Area Network operating on citizens' broadband radio service (CBRS) spectrum.

6. The method of claim 1, wherein the second periodic measurement report is generated in connection with a reporting process to the first access node.

7. The method of claim 1, wherein the second periodic measurement report further includes a cell identifier associated with the second access node and one or more Evolved Universal Mobile Telecommunications System Terrestrial Radio Access Absolute Radio Frequency Channel Numbers (EARFCN) values corresponding to the one or more PLMN identifiers, the handover search performed based on at least one of the cell identifier or the one or more EARFCN values.

8. The method of claim 1, further comprising a step of:
determining a Reference Signal Received Power (RSRP) value, a Reference Signal Received Quality (RSRQ) value, or Received Signal Strength Indicator (RSSI) corresponding to the second access node, the handover search performed based on the RSRP value, the RSRQ value, or the RSSI value being greater than a signal strength threshold value.

9. The method of claim 1, wherein the dynamically-triggered search timer value, the first PLMN identifier, and a minimum periodic search timer value are stored at a universal subscriber identity module (USIM).

10. The method of claim 1, wherein the list of one or more PLMN identifiers is a first list of one or more PLMN identifiers, and the handover search is a first handover search, and wherein the method further comprises the steps of:
obtaining a minimum periodic search timer value at the UE;
generating, a third periodic measurement report including a second list of one or more PLMN identifiers, the first PLMN identifier associated with the second network being absent from the second list of one or more PLMN identifiers; and
performing a second handover search based on the minimum periodic search timer value based on the first PLMN identifier being absent from the third periodic measurement report.

11. The method of claim 10, wherein the minimum periodic search timer value is between 1 minute and 8 minutes and the dynamically-triggered search timer value is between five seconds and 30 seconds.

12. A user equipment (UE) for establishing inter-operator network connections, the UE (a) configured with a predetermined wait time duration to execute searches for available networks, and (b) comprising:
a processor; and
one or more memory devices storing instructions that, when executed by the processor, cause the UE to:
establish a first connection with a first access node associated with a first network;
determine, from a first periodic measurement report, that the first network is not a home network of the UE based on the first periodic measurement report lacking a first public land mobility network (PLMN) identifier associated with a second network different from the first network;
obtain, after determining that the first network is not the home network, a dynamically-triggered search timer value based on the determination that the first network is not the home network;
generate a second periodic measurement report including a list of one or more public land mobility networks (PLMNs) detectable by the UE;
initiate, at a triggered search time indicated by the dynamically-triggered search timer value, a handover search based on the second periodic measurement report including the first PLMN identifier, wherein the triggered search time occurs prior to elapsing of the predetermined wait time; and
establish a second connection with a second access node of the second network based on the handover search,
wherein the second network is the home network of the UE, and
wherein the first network is not the home network of the UE.

13. The UE of claim 12, wherein the first network is a public network provided by a mobile network operator (MNO) and the second network is a private local area network (LAN) operating on citizens' broadband radio service (CBRS) spectrum.

14. The UE of claim 12, wherein the one or more memory devices include a universal subscriber identity module (USIM) and the dynamically-triggered search timer value is stored at the USIM.

15. The UE of claim 12, wherein the handover search is a higher priority PLMN search triggered by the periodic measurement report to find the second network.

16. The UE of claim 12, wherein the instructions, when executed by the processor, further cause the UE to:
enter an idle mode; and
determine whether the second periodic measurement report lists the first PLMN identifier based on the UE entering the idle mode.

17. A user equipment (UE) for establishing inter-operator network connections, the UE (a) configured with a predetermined wait time to execute searches for available networks, and (b) comprising:
a processor; and one or more memory devices storing instructions that, when executed by the processor, cause the UE to:
    generate a first periodic measurement report;
    perform a first handover search based on (i) a minimum periodic search timer value corresponding to the predetermined wait time, and (ii) a first public land mobility network (PLMN) identifier being absent from the first periodic measurement report;
    establish a first connection with a first access node associated with a first network based on the first handover search;
    determine that the first network is not a home network of the UE based on the first PLMN identifier being absent from the first periodic measurement report;
    generate, after determining that the first network is not the home network, a second periodic measurement report including a second list of one or more PLMN identifiers detectable by the UE;
    determine that the second list of one or more PLMN identifiers includes the first PLMN identifier;
    perform a second handover search based on a dynamically-triggered search timer value at least partly in response to the second periodic measurement report including the first PLMN identifier, wherein the dynamically-triggered search timer value causes the UE to perform the second handover prior to the predetermined wait time elapsing; and
    establish a second connection with a second access node associated with a second network based on the second handover search,
    wherein the second network is the home network of the UE, and
    wherein the first network is not the home network of the UE.

18. The UE of claim 17, wherein the first access node is a macro cell and the second access node is a small or femto cell operating on citizens' broadband radio service (CBRS) spectrum to connect the UE to the second network.

19. The UE of claim 17, wherein:
    the one or more memory devices includes a universal subscriber identity module (USIM);
    the minimum periodic search timer value and the dynamically-triggered search timer value are stored at the USIM; and
    the minimum periodic search timer value and the dynamically-triggered search timer value are different values.

20. The UE of claim 19, wherein the instructions, when executed by the processor, further cause the UE to store, at the USIM:
    a home PLMN (HPLMN) identifier or an extended home PLMN (EHPLMN) identifier associated with the second network; and
    a visitor PLMN (VPLMN) identifier associated with the first network.

21. The UE of claim 20, wherein the first PLMN identifier is the HPLMN identifier.

22. The method of claim 9, wherein a selection between the dynamically-triggered search timer value and the minimum periodic search timer is variable according to a disposition of the UE with respect to an operating range of the second network.

23. The method of claim 2, wherein the minimum periodic search timer value indicates that the predetermined wait time is at least one minute, and wherein the dynamically-triggered search timer value indicates that the duration of the triggered handover search time is between 5 and 30 seconds.

* * * * *